(12) United States Patent
Mishra et al.

(10) Patent No.: US 12,470,471 B2
(45) Date of Patent: Nov. 11, 2025

(54) MULTICAST IN-BAND TELEMETRY SYSTEM AND METHOD

(71) Applicant: Cisco Technology, Inc., San Jose, CA (US)

(72) Inventors: Mankamana Prasad Mishra, San Jose, CA (US); Praveen Bhagwatula, Cary, NC (US); Nitin Kumar, San Jose, CA (US); Krishnaswamy Ananthamurthy, Leander, TX (US)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 18/102,460

(22) Filed: Jan. 27, 2023

(65) Prior Publication Data
US 2024/0259288 A1   Aug. 1, 2024

(51) Int. Cl.
*H04L 43/12* (2022.01)
*H04L 12/18* (2006.01)
*H04L 43/06* (2022.01)

(52) U.S. Cl.
CPC .............. *H04L 43/12* (2013.01); *H04L 12/18* (2013.01); *H04L 43/06* (2013.01)

(58) Field of Classification Search
None
See application file for complete search history.

(56) References Cited

FOREIGN PATENT DOCUMENTS

WO   WO-2020263259 A1 * 12/2020 ............. H04L 41/12

OTHER PUBLICATIONS

Alibaba., "In-Band Network Telemetry (INT) Dataplane Specification," In-band Network Telemetry, Version 2.1, Nov. 11, 2020, pp. 1-56.
Asaeda H., et al., "Mtrace Version 2: Traceroute Facility for IP Multicast", Internet Engineering Task Force (IETF), Request for Comments 8487, Internet Society (ISOC) 4, Rue Des Falaises CH—1205 Geneva, Switzerland, Oct. 29, 2018, pp. 1-41, XP015128220, paragraphs [0003]-[0004].

* cited by examiner

*Primary Examiner* — Angela Nguyen
(74) *Attorney, Agent, or Firm* — Patterson + Sheridan, LLP

(57) ABSTRACT

In-band network telemetry for multicast is provided by injecting a synthetic telemetry packet into the multicast. Each first node of each branch replicates the synthetic packet and passes on copy to the next branch and sends one copy down the nodes in the branch sequentially. The synthetic telemetry packet can include flags with have values, including, for example, whether each node should hold or send data collected by the node according to the synthetic data packet, how long a node is to hold collected telemetry data, and what data to collect. The node sends a postcard to the originator with the telemetry data according to the instructions in the synthetic telemetry packet.

20 Claims, 5 Drawing Sheets

MULTICAST IN-BAND TELEMETRY SYSTEM AND METHOD

TECHNICAL FIELD

The present disclosure relates generally to in-band telemetry in multicast networks, for example, telemetry collected from select nodes.

BACKGROUND

In unicast networks, a single packet can be sent by a server across multiple nodes to a single destination. In-band telemetry has been used in unicast networks with multiple nodes to collect telemetry from each node in the unicast node sequence. In unicast, each node receives a synthetic telemetry packet, passed from node to node down the branch of the unicast transmission to the last node in the branch. Each node on the branch may broadcast the requested telemetry back to the originator in response to the synthetic packet. However, each node in a multicast network providing telemetry back an originator is complex and requires high overhead. Thus, there is a need for an alternative to applying unicast-style in-band telemetry in multicast.

BRIEF DESCRIPTION OF THE DRAWINGS

The accompanying figures, which are incorporated herein and form part of the specification, illustrate the multicast in-band telemetry system and method. Together with the description, the figures further serve to explain the principles of the multicast in-band telemetry system and method described herein and thereby enable a person skilled in the pertinent art to make and use the multicast in-band telemetry system and method.

DETAILED DESCRIPTION

In multicast networks, a single packet can be sent by a server and it will be received by many receivers on multiple branches. While broadcast packets may be received by all receivers in a particular network segment (or broadcast domain), multicast packets are received only by receivers that want them. Also, multicast receivers can be distributed throughout a larger network behind routers. Because a server only needs to send each packet once to reach all of the recipients, it is useful in situations where a large number of receivers need to receive the same data. Since the replication and distribution of these packets is done by the network rather than the head end server, it scales well to extremely large numbers of receivers.

Figure 1:
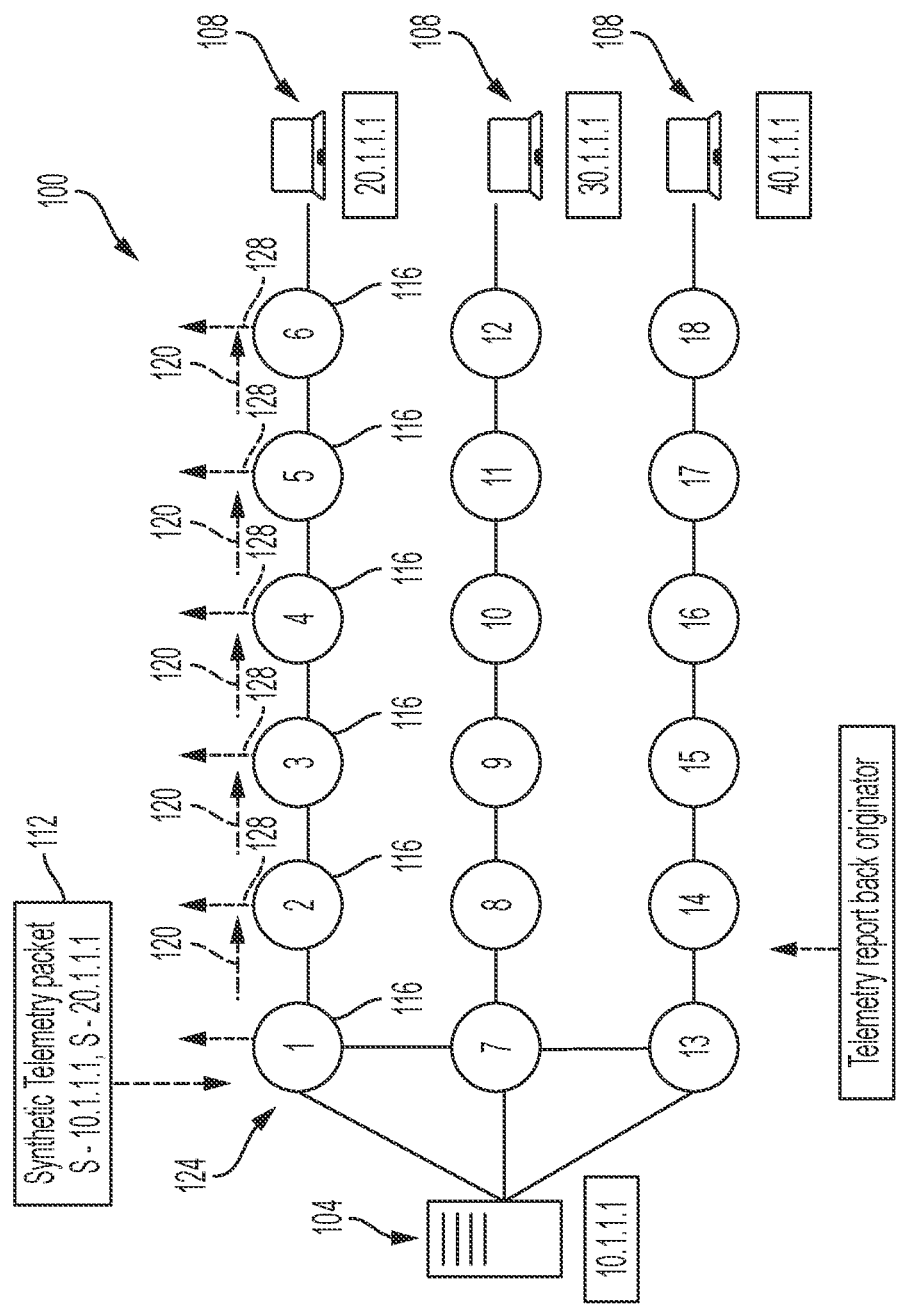
FIG. 1 shows a topology of a sample multicast network.

FIG. 1 shows topology of a sample multicast network 100. If there is need to collect telemetry data for flow from a server 104 to a destination receiver 108 (10.1.1.1, 20.1.1.1), a synthetic packet 112 is injected into the network 100. The synthetic packet 112 is intended to pass through the network 100 and collect data. The most common method is postcard In-Band Telemetry Export Data Mode (INT-XD), (eXport Data) due to its nature of no packet modification. As illustrated in FIG. 1, each node 116 receives a synthetic telemetry packet 112, passed from node to node down the branch of the unicast to the last node in the branch. Travel of the packet is illustrated by arrows 120. Each node 116 on the branch 124 broadcasts the requested telemetry back to the originator in response to the synthetic packet via a separate postcard transmission 128 from each node 116.

Various prior art mechanisms for IP multicast telemetry have been proposed, including "Mtrace Version 2: Traceroute Facility for IP Multicast. (RFC 8487: Mtrace Version 2: Traceroute Facility for IP Multicast (rfc-editor.org)). The scheme outlined in the referenced document does not allow for collection of data from the data path. This is because the Mtrace Version 2 scheme follows the control path, not the data path. There is no extension defined in the Mtrace Version 2 document for in-band telemetry data collection via the data path, though there were many implementations for unicast telemetry.

Figure 2:
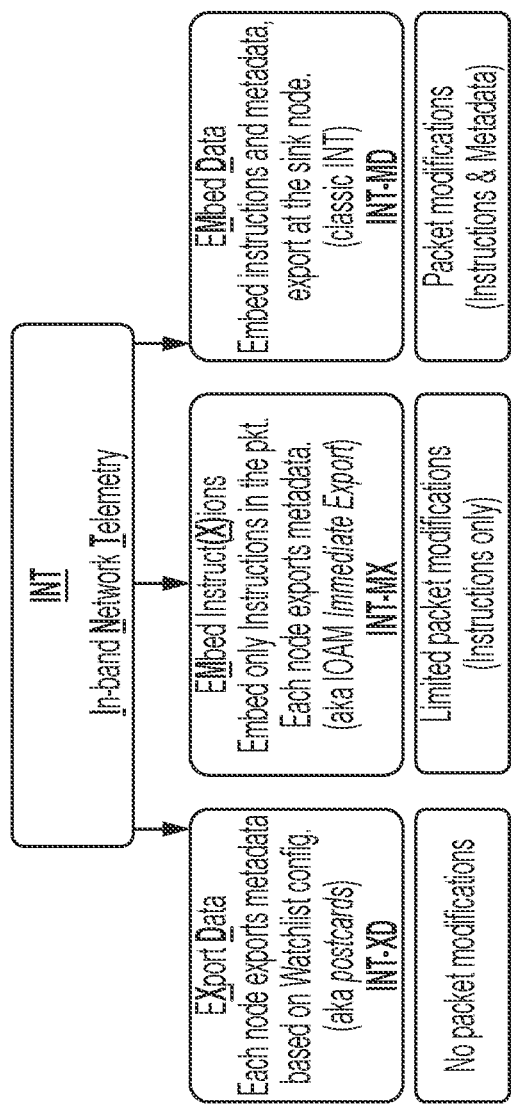
FIG. 2 illustrates the various in-band telemetry mechanisms.

FIG. 2 illustrates the various in-band telemetry mechanisms. Further discussion of the mechanisms can be found at https://www.rfc-editor/rfc/rfc8487.html, which is hereby incorporated by reference for all purposes as if fully set forth herein.

In In-Band Telemetry Embed Instructions Mode (INT-MX), only instructions are embedded in a packet, and each node exports metadata. The INT Source node embeds INT instructions in the packet header, then the INT Source, each INT Transit, and the INT sink directly send the metadata to the monitoring system by following the instructions embedded in the packets. The INT Sink node strips the instruction header before forwarding the packet to the receiver. Packet modification is limited to the instruction header—the packet size does not grow as the packet traverses more Transit nodes.

In In-Band Telemetry Embed Data Mode (INT-MD mode), each node in the packet forwarding path creates additional space in the INT-MD Header on-demand to add its own INT metadata. In INT-MD, both INT instructions and metadata are written into the packets. This is the classic hop-by-hop INT where 1) INT Source embeds instructions, 2) INT Source & Transit embed metadata, and 3) INT Sink strips the instructions and aggregated metadata out of the packet and (selectively) sends the data to the monitoring system.

According to principles described herein, a synthetic data packet is sent and telemetry collected for those nodes for which telemetry is requested via instructions in the synthetic packet. Thus, the reporting of telemetry may be selective based on the need for telemetry. In some cases, this can result in fewer than all nodes reporting telemetry, rather than every node receiving the synthetic data packet providing a report/telemetry.

Figure 3:
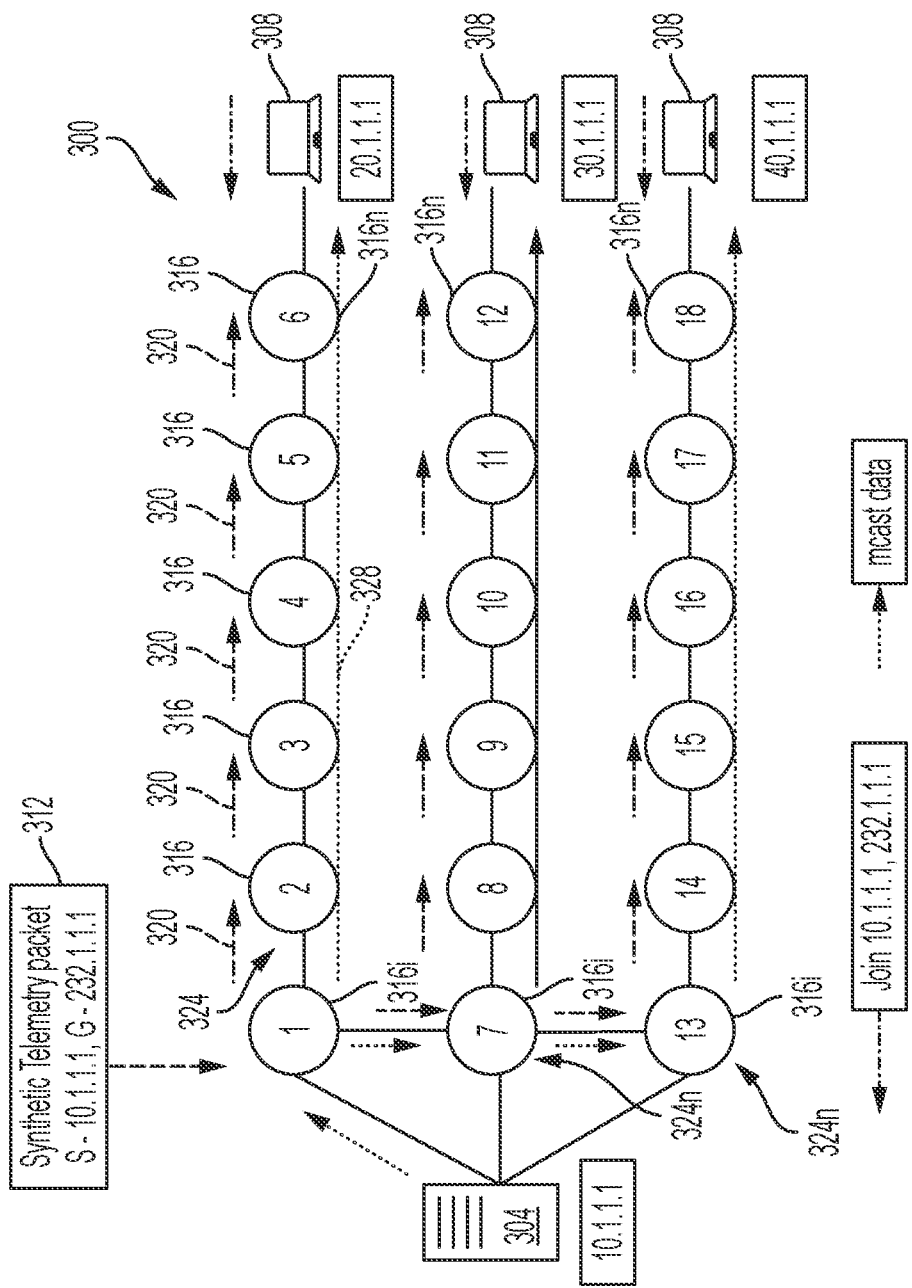
FIG. 3 illustrates a multicast network and telemetry reporting according to an aspect of the present disclosure.

FIG. 3 illustrates a multicast network 300 with a server 304 (10.1.1.1) attempting to communicate with a destination receiver 308 (20.1.1.1) via a first branch 324 of the multicast network 300. The first branch 324 includes a plurality of nodes 316. As illustrated in FIG. 3, the first branch 324 includes six nodes 316, Nodes 1-6, as an example for description purposes only. As can be appreciated, any number of nodes can be in the branch between the server 10.1.1.1 and the destination receiver 20.1.1.1, without departing from the spirit and scope of this invention. Communication from the server 304 to the destination receiver 308 is indicated by arrow 328.

In the illustration of FIG. 3, Node 1 is a first node 316-$i$ of the first branch 324 and Node 6 is the last node 316-$n$ of the first branch 324. FIG. 3 further illustrates additional branches 324*n* in the multicast between the server 304 (10.1.1.1) and other destination receivers 308 (30.1.1.1 and 40.1.1.1). The illustration in FIG. 3 shows three branches in the multicast network as an example for description purposes only. As can be appreciated, any number of branches 324 can be in the multicast network so that the server 304 (10.1.1.1) can communicate with a plurality of destination receivers 308.

In the example multicast of FIG. 3, each branch 324 includes a first node 316*i* and a last node 316*n*. In the second branch of FIG. 3, Node 7 is the first node 316*i* and Node 12 is the last node 316*n*, with 30.1.1.1 as the destination receiver. In the third branch of FIG. 3, Node 13 is the first node and Node 18 is the last node, with 40.1.1.1. as the destination receiver.

FIG. 3 illustrates a multicast in-band telemetry system and method according to the present disclosure. In a method according to principles described herein, a synthetic in-band telemetry packet 312 (S—10.1.1.1, G—232.1.1.1) is sent to the multicast network 300. The synthetic telemetry packet 312 includes some flags that have values indicative of instructions to each node. For example, a flag or flags can indicate which node is to report telemetry to the origin, the telemetry to be included in the report, the parameters of that telemetry, and the time frame for which the node is to hold the telemetry before reporting or dropping it.

To accommodate the synthetic packet 312 being sent through each branch 324 to the respective destination receiver 308, each first node 316*i* in each branch 324 replicates the synthetic packet 312 and sends one copy of the synthetic packet 312 down its respective branch and passes the other copy to the first node 316*i* of a next branch in the multicast. Since the synthetic packet 312 is a multicast packet, the replication may take place at a first node 316*i* and each branch 324 will get traffic along all nodes in the branch to the destination 308.

The synthetic packet 312 is injected into each branch 324 without response from each node 316 on the branch. The packet 312 proceeds through the network hop-by-hop, node-by-node, as indicated by the arrows 320. Each node provides some processing and passes the packet to the next node in sequence until the destination (20.1.1.1, 30.1.1.1. 40.1.1.1 . . . ##0.1.1.1) for each respective branch of the multicast. For example, each node 316 may calculate parameters defined in the packet 312, but does not transmit a report to the originator (as in unicast). Instead, each node 316 keeps the report for a hold time before reporting it to the originator (not shown) if instructed to do so or dropping it.

Telemetry data in the report may include, but is not limited to, path diagnostics, jitter, counts, or other user defined information. For example, the telemetry may include a node identifier, and at least one of path, timestamp and latency at the at least one node, the drop location and reason in case of packet drop, and so on.

Reporting to the originator can be performed by the node sending a "postcard", as in INT-XD.

Various IP addresses are used herein for the server and destination receivers for illustration only, and the IP addresses are not limited thereto for the purposes of this invention. IP Address 232.1.1.1 is a multicast IP address. Multicast IP addresses are used for one-to-many and many-to-many communication over an IP network. Multicast IP addresses are defined in RFC 5771 (IPv4) and RFC 4291 (IPv6).

An example method of collecting telemetry in a multicast network described herein includes injecting a synthetic telemetry packet 312 into the multicast network 300 at the initial branch node 316*i* of the first branch 324; the initial branch node 316*i* transmitting the synthetic telemetry packet to a next sequential node 316 of the first branch, wherein each sequential node transmits the synthetic telemetry packet 312 to a next sequential node in the first branch until the synthetic telemetry packet reaches the destination device of the first branch. The initial branch node 316*i* of the first branch 324 replicates the synthetic telemetry packet 312 and transmits the replicated synthetic telemetry packet 312 to the initial branch node 316*i* of the second branch 324. The initial branch node 316*i* of the second branch transmits the replicated synthetic packet to a next sequential node of the second branch. Each sequential node transmits the synthetic telemetry packet to a next sequential node in the second branch until the synthetic telemetry packet reaches the destination device of the second branch. The synthetic packet 312 defines which nodes of the plurality of sequential nodes are to collect telemetry, parameters for the collection of telemetry and instructions for transmitting the collected telemetry.

Each node that receives the synthetic packet, or a replication of the synthetic packet, processes the packet and acts on instructions in the packet with respect to that receiving node. Those that are instructed to report telemetry data report it, for example, by transmitting a "postcard" as in INT-XD.

The instructions in the packet include an instruction for at least one of the plurality of sequential nodes to transmit a report from the at least one node directly to an off-path device. The report includes telemetry data. In some embodiments, the instructions in the synthetic packet may not include an instruction for at least one of the plurality of sequential nodes to transmit a report. In other embodiments, the instructions in the packet may include an instruction for at least one of the plurality of sequential nodes to transmit a report. Each sequential node may process the packet before transmitting to the next sequential node. The synthetic packet may include a header including which nodes of the plurality of sequential nodes are to collect telemetry, the parameters for the collection of telemetry and the instructions for transmitting the collected telemetry.

In another example method for transmitting from a node in a multicast network, the node is one of a plurality of sequential nodes in a single branch of a plurality of parallel branches of the multicast network. The method includes receiving a replicated synthetic telemetry packet, wherein another replication of the synthetic telemetry packet traverses another branch of the multicast network and the replicated synthetic packet includes instructions for the node to transmit telemetry directed to a receiver external to the single branch; and upon receipt of the instruction, the node transmitting the telemetry to the receiver and forwarding the synthetic telemetry packet to a next node in the single branch or to a destination device in the branch. The instructions may include instructions for transmitting the collected telemetry. The telemetry may include a node identifier, and at least one of jitter, path, timestamp and latency at the at least one node, the drop location and reason in case of packet drop, and so on. The instructions in the synthetic packet include an instruction for at least one of the plurality of sequential nodes to transmit a report. The instructions in the synthetic packet may not include an instruction to transmit a report for at least one of the plurality of sequential nodes. In other words, the instructions in the packet may not instruct all the nodes in the branch or even in the multicast network to transmit telemetry.

A node in a branch of a multicast network may be configured to collect telemetry data and may include a receiver configured to receive a synthetic telemetry packet containing an instruction header and a processor may be coupled to the receiver and configured to collect the telemetry data at the node as instructed by the instruction header and to determine whether the synthetic telemetry packet comprises an instruction for the node to transmit collected telemetry data to an external device. The node includes a transmitter coupled to the processor, the transmitter configured to transmit the telemetry data to the external device according to instructions in the synthetic telemetry packet upon determination that the synthetic telemetry packet comprises an instruction for the node to transmit the telemetry data and to transmit the synthetic telemetry packet to a next node in or a destination device of the branch of the multicast network. In some embodiments, the synthetic telemetry packet is received from an upstream node in the branch of the multicast network. The synthetic telemetry packet may be replicated in other branches of the multicast network. The synthetic telemetry packet includes instructions for multiple nodes within the multicast network to send telemetry data to the external device and does not include instructions for at least one of the nodes to send telemetry.

Figure 4:
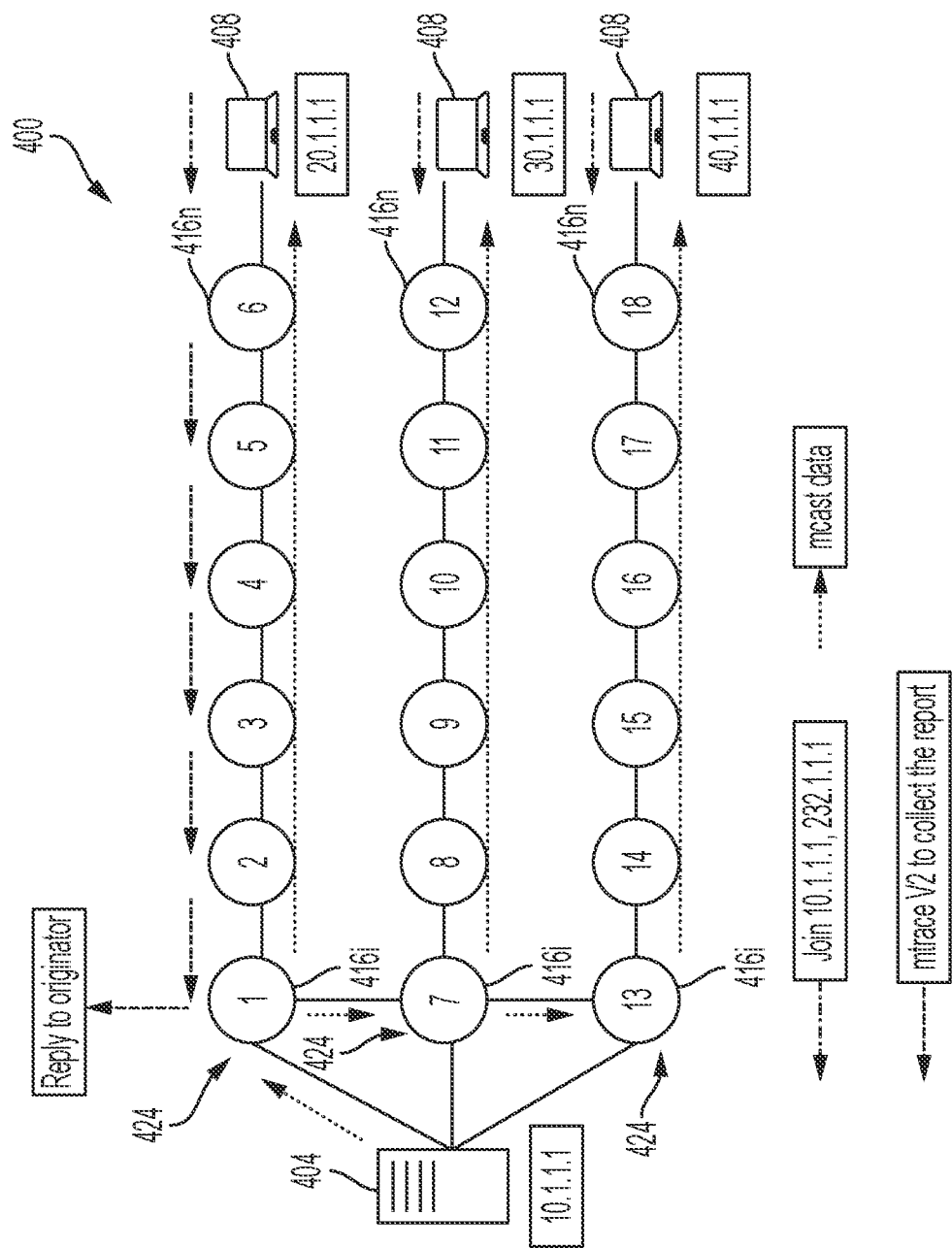
FIG. 4 illustrates a multicast network and telemetry reporting according to an aspect of the present disclosure.

Similar to FIG. 3, FIG. 4 illustrates a multicast network. In the illustration of FIG. 4, Node 1 is a first node 416*i* of the first branch 424 and Node 6 is the last node 416*n* of the first branch 424. FIG. 4 further illustrates additional branches in the multicast network between the server 404 (10.1.1.1) and other destination receivers 408 (30.1.1.1 and 40.1.1.1). The illustration in FIG. 4 shows three branches 424 in the multicast network as an example for description purposes only. As can be appreciated, any number of branches can be in the multicast network so that the server 404 can communicate with a plurality of destination receivers 408.

In the example multicast of FIG. 4, each branch 424 includes a first node 416*i* and a last node 416*n*. In the second branch of FIG. 4, Node 7 is the first node 416*i* and Node 12 is the last node 416*n*, with 30.1.1.1 as the destination receiver 408. In the third branch of FIG. 4, Node 13 is the first node 416*i* and Node 18 is the last node 416*n*, with 40.1.1.1. as the destination receiver 408.

In another aspect of multicast described herein, reports from the nodes can be collected using an Mtrace Version 2 in reverse from the destination to the originator (rather than the postcard method described above.). As illustrated in FIG. 4, Mtrace Version 2 can be used to collect the reported data. The steps are reversed and the mtrace traverses the path and signal node from which telemetry is expected and reports it to the originator/requester. The system can be configured such that only those nodes where mtrace signaling was done in advance will process the packet.

Referring to FIG. 4, according to principles described herein, a synthetic packet can be used to define which branch data is to be collected. Mtrace Version 2 infrastructure is used to traverse a path for which telemetry data is to be collected, and the synthetic packet can provide instructions for which nodes on that branch are to report data, as discussed above. The remaining nodes may collect data, but may drop it after a certain amount of time if not instructed to report.

As shown in FIG. 4, an mcast signal is sent through all nodes without processing and reflected back on the reverse path. The signal can be sent from the server 404 (10.1.1.1). On the reverse path, each node 416 on each branch may perform processing and append to the return signal the telemetry it has been instructed to send (or not to append telemetry if that node is not one for which telemetry data has been requested). Each branch of the network may perform such steps or may not, if telemetry for that branch is not included in the synthetic telemetry packet as a branch for which telemetry is to be collected.

In this manner, the end user can decide which branch data is to be collected. MTrace V2 infrastructure is used to traverse those paths for which data is to be collected. The remaining nodes drop the report after expiry of a hold timer. In this alternative embodiment, Mtrace first traverses through path and, on the return path of the Mtrace, signal node for which telemetry is requested reports to originator/requester via the reverse mtrace. In-band telemetry data is sent only by those nodes for which Mtrace signaling was done in advance.

Figure 5:
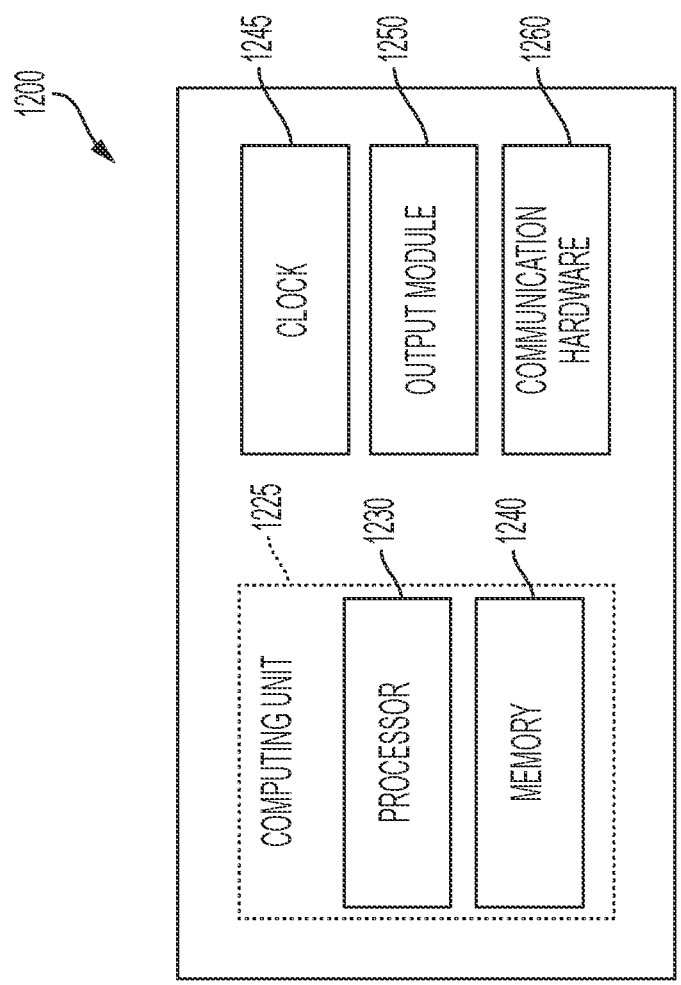
FIG. 5 illustrates a system capable of implementing computerized methods as described herein.

FIG. 5 illustrates a system capable of implementing computerized methods as described herein. In particular, the described equipment communicates with a computer processor configured to process one or more characteristics and/or profiles of the electrical signals received. By way of example and without limiting this disclosure to any particular hardware or software, FIG. 5 illustrates a block diagram of a system 1200 herein according to one implementation.

The system 1200 may include a computing unit 1225, a system clock 1245, an output module 1250 and communication hardware 1260. In its most basic form, the computing unit 1225 may include a processor 1230 and a system memory 1240. The processor 1230 may be a standard programmable processor that performs arithmetic and logic operations necessary for operation of the sensor system 1200. The processor 1230 may be configured to execute program code encoded in tangible, computer-readable media. For example, the processor 1230 may execute program code stored in the system memory 1240, which may be volatile or non-volatile memory. The system memory 1240 is only one example of tangible, computer-readable media. In one aspect, the computing unit 1225 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 1230 the machine becomes an apparatus for practicing the disclosed subject matter.

Any combination of one or more computer readable medium(s) may be utilized. The computer readable medium may be a computer-readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer-readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the vehicle computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

It will be apparent to those skilled in the art that various modifications and variations can be made to the disclosed systems and methods for locking detected touch location in a force-based haptic multifunction switch panel. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as hard drives, or any other machine-readable storage medium wherein, when the program code is loaded into and executed by a machine, such as a computer as shown in FIG. 5, and the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A method of collecting telemetry in a multicast network having a first branch and a second branch, each branch comprising a plurality of sequential nodes, the plurality of sequential nodes including an initial branch node and a destination device, the method comprising:
   injecting a synthetic telemetry packet into the multicast network at the initial branch node of the first branch;
   the initial branch node transmitting the synthetic telemetry packet to a next sequential node of the first branch, wherein each sequential node transmits the synthetic telemetry packet to a next sequential node in the first branch until the synthetic telemetry packet reaches the destination device of the first branch;
   the initial branch node of the first branch replicating the synthetic telemetry packet and transmitting the replicated synthetic telemetry packet to the initial branch node of the second branch; and
   the initial branch node of the second branch transmitting the replicated synthetic packet to a next sequential node of the second branch, wherein each sequential node of the second branch transmits the synthetic telemetry packet to a next sequential node in the second branch until the synthetic telemetry packet reaches the destination device of the second branch;
   wherein the synthetic packet defines which nodes of the plurality of sequential nodes are to collect telemetry, parameters for collecting telemetry and instructions for transmitting collected telemetry.

2. The method of claim 1, wherein each node that receives the synthetic packet or the replicated synthetic packet processes the packet and acts on the instructions in the packet with respect to that receiving node.

3. The method of claim 2, wherein the instructions in the packet include an instruction for at least one of the plurality of sequential nodes to transmit a report from the at least one of the plurality of sequential nodes directly to an off-path device.

4. The method of claim 3, wherein the report comprises telemetry.

5. The method of claim 2, wherein the instructions in the packet include an instruction for at least one of the plurality of sequential nodes to collect telemetry.

6. The method of claim 1, wherein the instructions in the synthetic packet do not include an instruction for at least one of the plurality of sequential nodes to transmit a report.

7. The method of claim 4, wherein the telemetry includes a node identifier, and at least one of jitter, path, timestamp and latency at the at least one node, packet drop location and reason in case of packet drop.

8. The method of claim 1 wherein the instructions in the packet include an instruction for at least one of the plurality of sequential nodes to transmit a report.

9. The method of claim 1, further comprising each sequential node processing the packet before transmitting to the next sequential node.

10. The method of claim 1, wherein the synthetic packet comprises a header including which nodes of the plurality of sequential nodes are to collect telemetry, the parameters for collecting telemetry and the instructions for transmitting the collected telemetry.

11. A method for transmitting from a node in a multicast network, the node being one of a plurality of sequential nodes in a single branch of a plurality of parallel branches of the multicast network, the method comprising:
    receiving a synthetic telemetry packet, wherein a replicated synthetic telemetry packet traverses another branch of the multicast network and the synthetic telemetry packet includes instructions for the node to transmit telemetry directed to a receiver external to the single branch; and
    upon receipt of the instruction, the node transmitting the telemetry to the receiver and forwarding the synthetic telemetry packet to a next node in the single branch or to a destination device in the branch.

12. The method of claim 11, wherein the telemetry includes a node identifier, and at least one of jitter, path, timestamp and latency at the at least one node, packet drop location and reason in case of packet drop.

13. The method of claim 11, wherein the instructions in the synthetic telemetry packet include an instruction for at least one of the plurality of sequential nodes to transmit a report.

14. The method of claim 11, wherein the instructions in the synthetic telemetry packet does not include an instruction for at least one of the plurality of sequential nodes to transmit a report.

15. The method of claim 11, wherein the synthetic telemetry packet comprises a header including which nodes of the plurality of sequential nodes are to collect telemetry, parameters for collecting telemetry and the instructions for transmitting the telemetry.

16. A node in a branch of a multicast network configured to collect telemetry data, comprising:
    a receiver configured to receive a synthetic telemetry packet containing an instruction header; and
    a processor coupled to the receiver, the processor configured to:
    collect the telemetry data at the node as instructed by the instruction header; and
    determine whether the synthetic telemetry packet comprises an instruction for the node to transmit the telemetry data to an external device;
    the node further comprising:
    a transmitter coupled to the processor, the transmitter configured to transmit the telemetry data to the external device according to instructions in the synthetic telemetry packet upon determination that the synthetic telemetry packet comprises an instruction for the node to transmit the telemetry data and to transmit the synthetic telemetry packet to a next node in or a destination device of the branch of the multicast network.

17. The node of claim 16, wherein the synthetic telemetry packet is received from an upstream node in the branch of the multicast network.

18. The node of claim 16, wherein the synthetic telemetry packet is replicated in other branches of the multicast network.

19. The node of claim 16, wherein the synthetic telemetry packet includes instructions for multiple nodes within the multicast network to send telemetry data to the external device.

20. The node of claim 16, wherein the synthetic packet does not include an instruction for at least one of a plurality of sequential nodes to transmit a report.

\* \* \* \* \*